Dec. 15, 1964   J. M. RUHGE   3,161,375
SOLAR CELL LOOK-ANGLE DETECTING SYSTEM
Filed Sept. 11, 1962   2 Sheets-Sheet 1
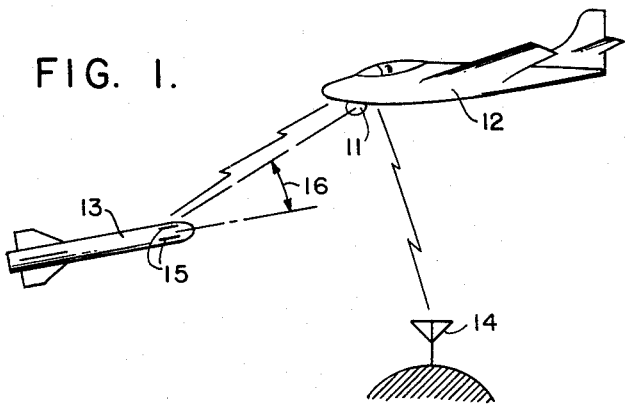
FIG. 1.
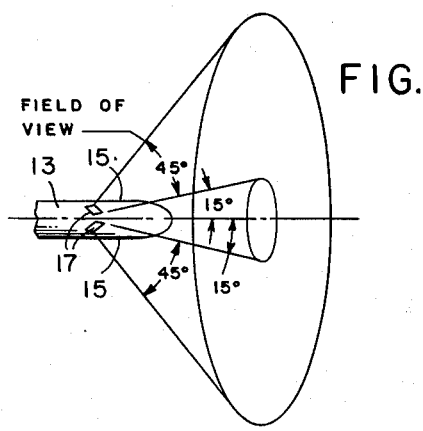
FIG. 2.
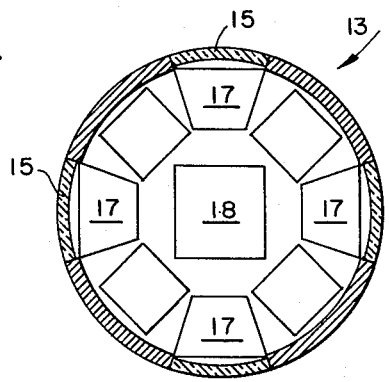
FIG. 3.
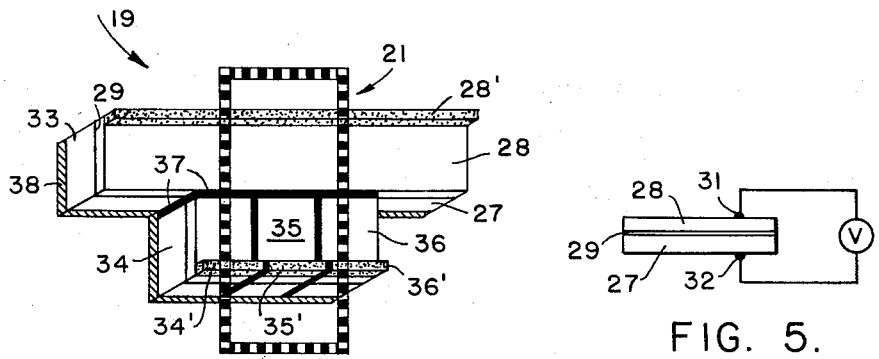
FIG. 4.
FIG. 5.
INVENTOR.
JUSTIN M. RUHGE
BY
P. H. Firsht
ATTORNEY.

Dec. 15, 1964 J. M. RUHGE 3,161,375
SOLAR CELL LOOK-ANGLE DETECTING SYSTEM
Filed Sept. 11, 1962 2 Sheets-Sheet 2

*INVENTOR.*
JUSTIN M. RUHGE
BY

P. H. Firsht
ATTORNEY.

United States Patent Office 3,161,375
Patented Dec. 15, 1964

3,161,375
SOLAR CELL LOOK-ANGLE DETECTING SYSTEM
Justin M. Ruhge, China Lake, Calif., assignor to the United States of America as represented by the Secretary of the Navy
Filed Sept. 11, 1962, Ser. No. 223,311
9 Claims. (Cl. 244—14)
(Granted under Title 35, U.S. Code (1952), sec. 266)

The invention herein described may be manufactured and used by or for the Government of the United States of America for governmental purposes without the payment of any royalties thereon or therefor.

The present invention relates to a device used in determining the position of a source of a bar, or spot of light relative to the device, and more particularly to a device utilized in an instrumentation system for indicating the relative orientation between a high velocity missile and its designated target.

The device of the present invention is to be utilized in systems of the general type disclosed in co-pending application Serial No. 150,848, filed November 7, 1961, wherein a test missile having a high velocity is directed toward a high speed target, and information relative to the interception thereof is obtained for evaluating the effectiveness of the missile.

The orientation of the missile relative to its target may be determined by measuring the range and the angle formed by the longitudinal axis of the missile and a line drawn from a point on this axis to a point on the target. The angle thus defined is hereinafter referred to as the look-angle.

One of the prior art systems, for obtaining information relative to the interception of a missile with its target, utilized a plurality of cameras mounted on the ground and in the target aircraft. However, this system has not been entirely satisfactory for the evaluation of operative missiles due to inaccurateness and incompleteness of the information obtained in this manner.

The general purpose of the present invention is to provide a non-recoverable, missile-mounted device which is capable of indicating the look-angle prior to, and at the time of fuze operation of a directional warhead and transmitting this information to the ground through a telemetering system, a component of which may, if desired, be disposed in the target for relaying the information to the ground.

Therefore, an object of the present invention is to provide a device utilized in discerning the relative positions of radiation sources located in space.

Still another object is to provide a device applicable to the field of missile guidance and operation, for obtaining information relative to the interception of a missile with its target through the utilization of a radiation emitted by the target and impinging on the missile.

Other objects, advantages and novel features of the invention will become apparent from the following detailed description of the invention when considered in conjunction with the accompanying drawings wherein:

FIG. 1 is a schematic view illustrating a system in which the device is utilized;

FIG. 2 is a cross sectional view taken generally along the longitudinal axis of the missile illustrating the field of view of the look-angle indicators mounted in the missile;

FIG. 3 is a vertical cross sectional view illustrating the position of a portion of the system of the present invention with respect to the missile body;

FIG. 4 is a perspective view of an array of photovoltaic cells of the present invention;

FIG. 5 is an end view of a single photovoltaic solar cell;

Figure 6:
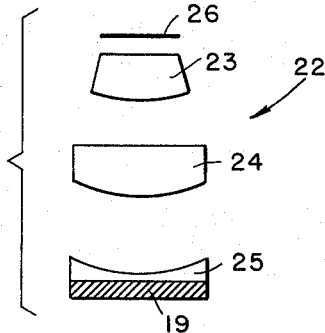
FIGS. 6 and 7 are side elevation views taken 90° apart which illustrate the lens arrangement for directing a bar of light onto the device of the present invention.

Referring now more specifically to the drawings, wherein like reference characters designate like or corresponding parts throughout the several views, there is illustrated, in FIG. 1, a system having a light generating source 11 mounted on a vehicle generally designated 12, a missile generally designated 13, and a receiving antenna 14. Arranged about the circumference of the missile 13 are a plurality of windows or ports 15 behind which are disposed look-angle indicators 17 for viewing the source of light 11 and transmitting the information relating to the look-angle 16, as will hereinafter be more fully described.

Turning now to FIG. 2, wherein is schematically illustrated the arrangement of look-angle indicator devices 17 about a forward portion of the circumference of the body of the missile 13, which indicators are arranged for viewing through the windows or ports 15 at an angle of 45° beginning at 15° with respect to the longitudinal axis of the missile. The devices 17 are capable of being adjusted on their mounts (not shown) to view an angle of 135° with respect to the longitudinal axis of the missile. The system is designed and the indicators so arranged that an ordinary zone of acceptance 45° wide, shaped as a hollow cone with its apex at the longitudinal axis of the missile, is formed about the forward portion of the missile. The look-angle indicators 17 are confined within the body of the missile and are disposed adjacent an amplifying and telemetering circuit 18 which serves to telemeter the information, obtained through the indicators, to receivers remotely disposed with respect to the missile. Within each port 15 is a soft glass member ground to fit the curvature of the missile skin and held in place by a combination close-fitting mechanical seat and epoxy-bonding agent to form a suitable structural adjunct to support the airframe of the missile, reduce drag and generally protect the interior of the missile. The radius of curvature of the body of the missile limits and dictates the size and number of ports and the associated indicators necessary to provide the desired area coverage for the system.

Each indicator 17 includes an array of photovoltaic solar-cells, generally designated by the reference numeral 19, upon the surface of which a light bar image 21, being radiated from the source 11, is caused to be focused as illustrated in FIG. 4.

Figure 7:
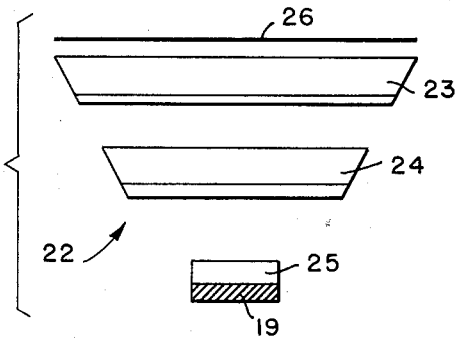

For focusing radiation from the source 11 into a bar image 21 at the surface of the array 19, each indicator includes an optic or lens system, generally designated by the reference numeral 22, which is disposed between the openings, or ports 15 and the solar-cell array 19. Each of the lens systems comprises a plurality of cylindrical lenses, being of the general configuration and relatively disposed, in the manner as illustrated in FIGS. 6 and 7, wherein a stop lens 23 is placed above the vortex of a first lens 24 and a corrective lens 25 corrects for the non-linearity in the displacement of the image as it moves to the edge of the field of view. The lens system thus produces the bar image 21, as hereinbefore referred to, which is caused to sweep across the surface of the array 19 by changing the relative positions between the source and the missile body.

Since this device operates in the visible portion of the spectrum, consideration must be given to the effect that background light will have on the operation and output of the device. The spectral response of the standard solar cell has a broad peak of 95 percent from .7–.9μ. This response provides a flexibility in choosing a filter 26 having a point for cutting off short wavelength light, which for example may be around .7μ, when utilizing a source with a peak emittance of .8–.9μ.

Therefore, the light which radiates from the moving source 11, and directed toward ports 15, is caused to pass through the filter 26, which passes only light having the desired wavelength, and then through the lens system 22 wherein it is formed into a bar of light and caused to sweep across the surface of the solar-cell array 19 of the look-angle indicator to cause a voltage to be generated within the array.

In order that a voltage may be caused to occur in a solar-cell array, the array is formed of a plurality of photovoltaic solar cells. Each of the cells comprises an N-type wafer of silicon 27 into which a layer of P-type material 28 is diffused to form a P-N junction 29, as illustrated in FIG. 5. A pair of terminals 31, 32 is arranged at opposite sides of the P-N junction so that as a bar or spot of light is caused to impinge on the surface of the P material a current is generated and a voltage is caused to appear across the terminals. The magnitude of the voltage thus generated is proportional to the intensity of the light and to the area of the surface that is covered by the light bar as it impinges thereon.

One manner in which the aforementioned principle may be utilized is in determining the relative position of a bar of light having a fixed intensity and a width equal to that of the solar cell upon which it is caused to impinge. This may be accomplished by relating the voltage obtained from the cell at the output terminals when the cell is partially covered by the bar of light, to that obtained at the terminals when the bar of light completely covers the surface area of the cell. By utilizing a bar of light impinging with a fixed intensity, a reference point is thus established so that any change of voltage occurring, at the output terminal, is due only to a change effected through a change in the extent to which the surface area of the cell is covered by the bar of light and is directly proportional thereto. However, where both the intensity of the light and the extent of cell coverage are allowed to vary, these reference points are necessarily lost and other means for establishing a reference must be provided. It has been found that under such circumstances another solar cell, hereinafter referred to as an auxiliary cell, may be utilized to monitor the intensity of the bar of light and thus a means for establishing a reference point is provided. This procedure requires that both cells generate the same voltage per unit area covered, and per unit intensity for a given bar of light. This, of course, is possible by utilizing a single stock piece for both cells.

When utilizing an auxiliary cell, in determining the relative position of a bar of light impinging on the surface of the solar cell, it is necessary to first obtain the percent of the solar cell that is covered by the bar. This is accomplished by establishing the ratio of the output voltage of the solar cell to the output voltage of the auxiliary cell which is utilized to indicate the intensity with which the bar of light impinges on the surface of the cell. By observing the voltage occurring at the output terminals of the auxiliary cell, the maximum possible voltage output from the solar cell, at that given instant, may be accordingly established. Hence, the ratio of the solar cell output voltage to the auxiliary cell output voltage serves to indicate the percentage, or extent to which the solar cell is covered by the light bar.

When the ratio, above-described, indicates that 100 percent of the solar cell is covered by the bar of light, it is understood that the center of the bar is disposed at the center of the surface upon which it impinges, remembering of course, that the bar and the cell are of the same width. However, when only a coverage of 50 percent is indicated, by the output voltage ratio, it is readily understood that only one half of the cell is covered, and therefore, only one half of the bar impinges on the cell thus placing the center of the bar at one side edge of the cell. As the percentage of cell surface coverage increases from 50 and approaches 100 percent, the center of the bar of light must necessarily and simultaneously approach the center of the cell from its disposition at the edge portion thereof. Since the position of the center of the bar is indicated through the percentage derived from the ratio of the solar-cell output to the auxiliary cell output voltage, each increment of movement of the bar corresponds to an increment of the percentage indicated by the ratio. Therefore, when a 60 percent coverage is indicated, it is understood that the center of the bar has been moved toward the center of the cell to increase the coverage by 10 percent, or has been displaced inwardly from the edge by 10 percent of the width of the cell. If the cell and a lens system used with it are designed and calibrated so that a change of 10 percent in voltage output corresponds to 10 degrees change in position of the bar of light, passing through the lens system, the position of the source directing the light may be determined with respect to the cell.

The system just described has the disadvantages of not being capable of indicating the directional side of the solar cell surface to which the center of the bar of light is disposed, and requires that the width of the bar of light be equal to the width of the solar cell, thus rendering the system undesirable for use in look-angle indicator systems. However, since the present invention utilizes the foregoing basic principles, a description is hereinabove set forth to provide an understanding thereof, which is considered desirable in order that the device of the present invention be more clearly understood.

In order that the position of a bar of light, having a variable position and intensity, may be determined so that the device may be utilized in a look-angle indicator, it has been found that additional solar cells may be employed and arranged into a solar-cell array of the configuration generally illustrated in FIG. 4.

The solar-cell array 19 comprises plurality of photovoltaic solar cells 33, 34, 35 and 36 disposed in adjacent relationship and so arranged as to form a T-shaped configuration with the cell 33 constituting a light monitoring reference cell having a continuous strip of P-type material diffused into the N-type material, as aforedescribed, extending in the direction of the cell's longitudinal axis. This axis is disposed transversely of the longitudinal axis of a group of adjacently disposed parallel cells 34–36, with the cell 33 extending for a distance as great as at least twice the combined width of the group of three adjacent cells with the cell 33 extending equally at each side of the group of cells. The group of cells 34–36 extends longitudinally to abut the reference cell 33 at a right angle thereto, and has a length extending along its longitudinal axis equal to the width of the reference cell 33.

Figure 8:
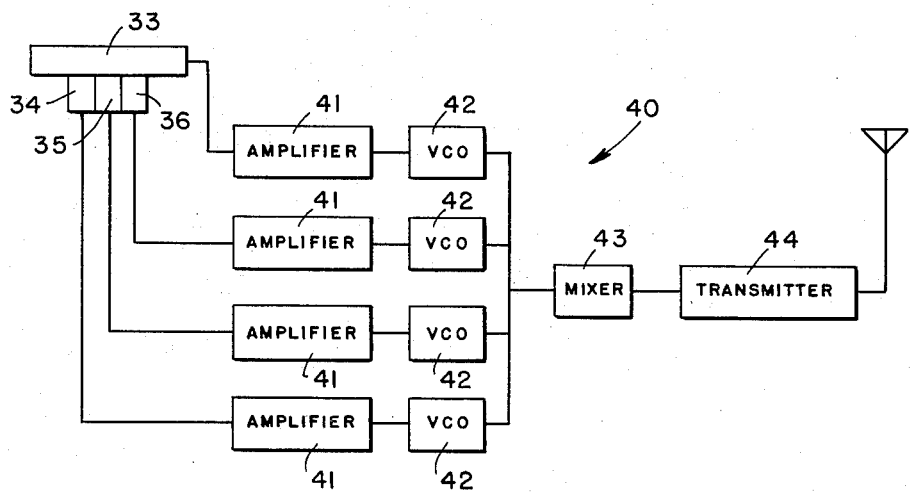
FIG. 8 is a schematic diagram illustrating the circuitry utilized to telemeter the information obtained through the multiple cell array of the present invention.

The cells 33–36 are insulated each from the other, by strips 37, to obviate an occurrence of any significant flow of current between the cells. A metal substrate 38, FIG. 4, may be provided as a common electrode for the array 19, with metallic contacts 28', 34', 35' and 36' serving as electrodes at the opposite side of each of the cells, respectively. For purposes of calibration, each of the cells 34–36 is considered to be divided into 15 equal parts thus providing 45 parts arranged in sequence, with electrical output terminals at each cell surface, as illustrated in FIG. 5, which serve to conduct the electrical output from the cell to a voltage measuring device, or to a telemetering circuit 40, FIG. 8. The circuit generally comprises an amplifier 41 and a voltage-controlled subcarrier oscillator 42 for each cell, a mixer amplifier 43 and a transmitter 44, which serve to amplify and telemeter, respectively, the voltage output information obtained from the array 19, to receivers, which, for example, may be located in the target aircraft 12. From here the signals are relayed to the antenna 14 of the ground receiver to be reduced and the desired look-angle information obtained therefrom.

The cells of the array 19, through their unique arrangement, are capable of indicating the position of the bar of light in the following manner which typifies the operation of the system. It is assumed, for purposes of illustration, that a bar of light impinges on the surface of the solar-cell array 19, in a manner at illustrated in FIG. 4, causing cell 33 to generate 90 millivolts, cell 34 to generate 30 millivolts, cell 35 to generate 50 millivolts, and cell 36 to generate 10 millivolts. As 90 millivolts indicates the maximum voltage which may be generated by a bar of light of the given intensity, it is understood, therefore, that the output from cell 34 comprises 33.3 percent of the total possible voltage, the output from cell 35 comprises 55.5 percent of the total possible voltage, and the output from cell 36 comprises 11.1 percent of the total voltage. Since the output at the reference cell 33 reads 90 millivolts, or 100 percent for the total bar width, with 50 percent of the output occurring at each side of the center of the bar, and 33.3 percent of the total voltage output is obtained from cell 34, 33.3 percent of the total width of the light bar impinges on cell 34 leaving 66.7 percent of the total width of the bar elsewhere disposed on the surface of the array. Therefore, as there are outputs occurring from cells 35 and 36 it necessarily follows that the bar impinges on these cells also, accordingly, the center of the bar must be located to the right of cell 34. By determining the difference between the width of the bar responsible for 33.3 percent of the total output and that responsible for 50 percent of the total output, or 16.7 percent of the total width, one obtains the percentage of the bar which produces the signal between right edge of cell 34, or the left edge of cell 35, and the location of the center of the bar located thereon. Remembering that each cell may be considered to be divided into 15 equal parts, the distance from the left edge of cell 35 to the center of the bar may be expressed in units, or degrees. Since 55.5 percent of the total output of cells 34–36 is obtained from cell 35, and 16.7 percent is the difference between the output obtained from cell 34 and 50 percent of the total output of the cells 34–36, resulting from 50 percent of the bar width, the percentage of cell 35 between the left edge thereof and the center of the bar may be established and the percentage related to units, or degrees by dividing 16.7 by 55.5 and multiplying by 15, or $16.7/55.5 \times 15 = 4.5$ degrees, which is the distance in units or degrees from the left edge of cell 35 to the center of the bar of light. If it is assumed that the zero unit position of the array is located at the extreme left edge of cell 34, then the center of the bar, in the instant example, is disposed 15 plus 4.5, or 19.5, units or degrees to the right of zero thus the position of the center of the bar is established.

With the foregoing description in mind, the operation of the look-angle indicator of the present invention is hereinafter described and summarized.

With plurality of the look-angle indicators 17 disposed about, and within the circumference of an airborne missile 13, and mounted to view through ports 15 in the direction of travel, an angle of 45 degrees, beginning at 15 degrees with respect to the longitudinal axis of the missile, and with an approaching target 12 bearing a light source 11 of sufficient intensity to be detected by the indicators 17, a beam of radiated light passes through a near port 15 in the wall of the missile to impinge on an indicator disposed within the missile. As the light beam impinges on the indicators and passes through the filter 26 the background light or skylight is filtered and the light of desired wavelengths passes through the lens system 22, which forms and directs a bar of light 21 onto the surface of the cell. The light bar is wider than a single cell of the array, but no wider than the combined width of cells 34–36. As the bar of light 21 impinges on the surface of the array it strikes the P-layer 28 of each cell and causes a current to be generated and a voltage to occur across the output terminals of the cells. The voltage output signal obtained from each of the cells is then amplified and transmitted to a receiver located in the target aircraft, or elsewhere as desired, and then relayed to the receiver antenna 14 where the signals are reduced, or computed to determine the location of the center of the bar of light, in the aforedescribed manner, to thus establish the look-angle, as hereinabove defined, through determining the relative location of the source of the light located at the target.

Obviously many modifications and variations of the present invention are possible in the light of the above teachings. It is therefore to be understood that within the scope of the appended claims the invention may be practiced otherwise than as specifically described.

What is claimed is:

1. A system for determining the look-angle of a missile as it approaches its moving target comprising: means including a source of radiating light disposed at a target for radiating a beam of light; viewing means arranged within a leading portion of a missile for receiving the beam; lens means mounted within the said viewing means for converting a portion of the beam of light into a bar image and directing the bar along a path as the light passes therethrough; a photovoltaic cell array adapted to initiate a plurality of independent electrical currents disposed in the path of the directed bar so that the bar may be caused to impinge on the surface of the array and be displaced thereacross as said source is displaced relative to said missile; electrical output terminals mounted on said array for conducting a plurality of currents from said array; a telemetering circuit connected with said output terminals for converting conducted currents to intelligence signals and telemetering the signals to the target; means mounted in said target for relaying the signals; and means remotely disposed from said target for receiving the signals from the target and reducing the signals to intelligence whereby the look-angle may be determined.

2. The system as defined in claim 1 being further characterized in that a filter is provided adjacent the lens means to filter out light of undesired wavelengths.

3. The system of claim 2, being further characterized in that the photovoltaic cells comprise solar cells having a P-N junction.

4. The system of claim 1, being further characterized in that the array is formed from a plurality of photovoltaic solar cells, each having a P-N junction and having the output terminals mounted at opposite sides of the junction, and being arranged in the array with a group of three cells disposed parallel to each other in a side-by-side but insulated relationship for thereby forming a first component of a T-shaped configuration, and a single reference cell having a width equal to the length of the cells of the group, and being disposed adjacent the ends of the cells of the group at right angles thereto and insulated therefrom to form a second component of the T-shaped configuration, with the second component having a length equal to twice the combined width of the cells of the group and extending equally from each side of the first component of the configuration.

5. A solar cell array for indicating the position of a bar of light impinging thereon, comprising: a group of adjacent photovoltaic solar cells so arranged as to provide an array having two components so disposed as to form a T-shaped configuration with one component thereof comprising a single solar cell lying along a first axis extending in a given direction and with a second component thereof comprising three adjacent solar cells lying along a longitudinal axis and extending at a right angle from the first axis; a common terminal connected with said cells; insulating means disposed between each of said cells for obviating a conduction of an electrical current therebetween; and an output terminal singly connected with each cell of the array, whereby a plurality of independent voltage output values may be obtained when a bar of light is caused to be focused thereon so that the differential in the output values may serve to indicate the relative position of the bar.

6. In a system for determining the instant relative position of a radiating source of light disposed at a target, a look-angle detector comprising in combination: a plurality of voltage generating solar cells arranged adjacent each other for simultaneously producing voltage outputs of independent magnitudes when a single bar of light is caused to simultaneously impinge on the surface of each of the cells; a pair of electrical output terminals mounted at each of the cells in an electrical conducting manner so that the magnitude of the voltage outputs of each cell may be determined simultaneously with, and independently of each of the other cell outputs; and a lens system including a stop lens and a nonlinearity correcting lens for forming a bar of light from the beam radiating from said source and directing said bar onto and across the surfaces of said cells in a manner as dictated by source displacement, whereby the magnitude of the individual voltages may be compared for determining the relative position of the radiating source of light.

7. In the combination as defined in claim 6, further characterized in that the solar cells comprise photovoltaic cells formed with a P-N junction.

8. The combination as defined in claim 6, further characterized in that the plurality of cells comprise a reference cell disposed along a horizontal longitudinal axis; a group of three solar cells horizontally disposed in a side-by-side relationship about a longitudinal axis which intersects at right angles and bisects the longitudinal axis of said reference cell to form a solar cell array having a T-shaped configuration, and means for insulating each of the cells from the remaining cells of the plurality whereby only an insignificant current may be caused to flow between the cells.

9. Claim 8, further characterized in that the length of the reference cell is at least twice the combined width of the group of three cells, and the cells of the group have a length which is equal to the width of the reference cell so that the center of the bar of light having a maximum width equal to the combined width of the group may be located at either the right or left edge of the group of three solar cells.

References Cited by the Examiner

UNITED STATES PATENTS

| | | | |
|---|---|---|---|
| 2,721,275 | 10/55 | Jackson | 250—222 |
| 3,046,892 | 7/62 | Cosse et al. | 244—14 |
| 3,047,723 | 7/62 | Knapp | 343—12 |
| 3,074,063 | 1/63 | Horton | 102—70.2 |
| 3,095,564 | 6/63 | Cartwright | 343—12 |

SAMUEL FEINBERG, *Primary Examiner.*